Oct. 28, 1941.     C. J. SURDY     2,260,759
AUTOMOTIVE TRANSMISSION
Filed March 25, 1938
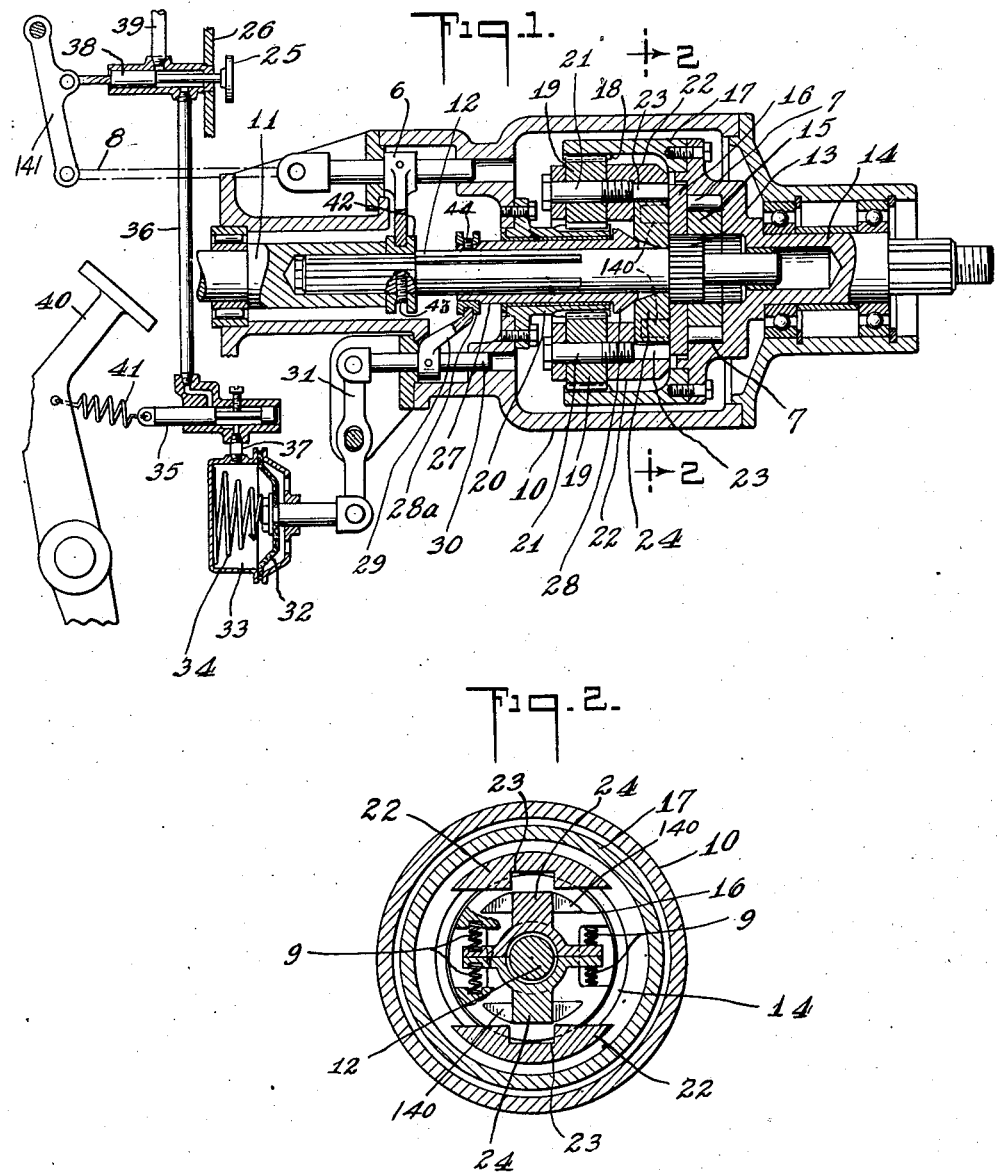
INVENTOR.
Charles J. Surdy Patented Oct. 28, 1941

2,260,759

UNITED STATES PATENT OFFICE 2,260,759

AUTOMOTIVE TRANSMISSION

Charles J. Surdy, Tuckahoe, N. Y.

Application March 25, 1938, Serial No. 197,976

8 Claims. (Cl. 192—4)

This invention relates to automotive transmissions and more particularly to transmissions known as the "overdrive" and "freewheeling" types.

Transmissions of the type described permit operation of the automotive vehicle at higher rates of speeds with lower speeds of the engine by providing a gear train which is set into operation whenever the resistance of the road is less than the power output operating the vehicle wheels; in other words, when the vehicle coasts so that the wheels are in effect driving the motor, the gear train is set into operation.

A serious disadvantage of these "overdrive and freewheeling" devices is that braking of the vehicle is difficult because the moment the operator releases the accelerator pedal to operate the brakes, the vehicle "coasts" and the compression of the motor is not available as an added braking medium. Consequently, the use of "overdrive and freewheeling" devices in hilly and mountainous regions is not deemed safe. Its use in heavy traffic is likewise not usually feasible.

It is the principal object of this invention to improve the "overdrive and freewheeling" device so that its operation will be possible under all conditions.

More specifically, the invention contemplates improving the "overdrive and freewheeling" device whereby application of the vehicle brakes place the device into an "in gear" position.

It is also an object of this invention to provide, in an overdrive device, means responsive to movement of a speed control pedal for energizing a servo-motor operatively connected with a pawl or dog essential to overdrive operation.

It is a further object of this invention to use fluid power to so actuate this device.

These and other objects, together with their attendant advantages, will become apparent upon reading the following specification in connection with the accompanying drawing, in which Fig. 1 is a diagrammatic view showing the invention in section; and Fig. 2 is a sectional view taken on the line 2—2 of Fig. 1.

The "overdrive and freewheeling" device is mounted back of the ordinary transmission and is housed in a casing 10 into which projects the power take-off shaft 11 of the change speed transmission. A mainshaft 12 is slidably keyed within the take-off shaft 11 and is provided with a toothed portion 13. This toothed portion 13 is arranged to engage internal teeth formed in the tailshaft 14, the freewheel cam 15 and the plate 16.

The tailshaft 14 has secured thereto a drum or ring gear portion 17 provided with internal gear teeth 18 which mesh with planetary gears 19. A sun gear portion 20 is secured to the casing 10 and engages the planetary gears 19 to complete an epicyclic gear train. The planetary gears 19 are supported upon pintles 21 which carry a cage portion 22 whereby the planetary gears 19 may revolve about the sun gear 20 and at the same time rotate about respective pintles 21.

Plate structure 16 carries weighted pawls 24 which are received in guide forming projections 140 and arranged to engage grooves 23 in the cage 22. The weighted pawls 24 are held inwardly by springs 9 and are adapted to engage grooves 23 upon relatively rapid rotation of mainshaft 12 and plate 16, whereupon centrifugal force overcomes the resistance of the springs 9 and the weighted pawls 24 tend to fly outwardly. Usually, this occurs when the car is operating at speeds in the neighborhood of 40 M. P. H.

When the operator pushes in the control button 25 on the dash board 26, the pivoted lever 141 operates a connecting member 8, which is secured to a shifter 6 for moving the collar 42 and mainshaft 12 to the left whereby the toothed portion 13 thereof engages the plate 16 and freewheel cam 15. The collar 42 is secured to the mainshaft 12 by means such as a screw 43. In speeds below 40 M. P. H., the flow of power is through the cam 15, roller 7 and tailshaft 14. Upon reaching a speed in excess of 40 M. P. H., the weighted pawls 24 tend to fly outwardly. Engagement of the grooves 23 by the pawls 24 cannot be accomplished until the foot is taken off the accelerator pedal in order that the mainshaft 12 and the weighted pawls 24 may slow down so as to approximately equal the speed of the cage 22. As soon as these speeds are equalized, the pawls 24 all are able to insert themselves into the closely fitting grooves 23. The car is then in "overdrive" and the flow of power is from the mainshaft 12 to the plate 16 and pawls 24, thence through cage 22 to the drum 17 by planetary gears 19. This results in the tailshaft 14 rotating at a higher speed than the mainshaft 12.

Thus far, the mechanism described is more or less conventional and has proved to be highly desirable in attaining high vehicle speeds at low R. P. M. of the engine crankshaft. This results in better fuel performance as well as increased motor life.

There is, however, an objectionable feature in such devices. In the main, this objection is based upon the fact that considerable care must be exercised in operating the car because the "overdrive" and/or "freewheeling" arrangement renders braking more difficult. This is due to the fact that as soon as the operator releases his foot from the accelerator pedal, the vehicle "coasts" and to bring it to a stop requires greater braking effort because the engine is not functioning to assist in braking of the car. This is especially noticeable in descending grades. Consequently, the use of "overdrive" and/or "freewheeling" is discouraged in hilly or mountainous country. Its use in traffic is also unsafe because sudden stops require quick braking action, which is not possible when the car "coasts."

In order to obviate this objectionable feature of the "overdrive" and/or "freewheeling" devices, the following mechanism is provided. Upon the mainshaft 12, a sleeve 27 is slidably keyed whereby its inner portion 28 may be moved underneath the pawls 24 for moving them to a position for engaging the grooves 23. The other end of the sleeve 27 is provided with a collar 28a secured by a screw 44 to the sleeve 27 and engaged by a fork 29 mounted on a shifter shaft 30. Shaft 30 is operatively connected to one end of a fulcrumed lever 31, the opposite end of which is connected to a movable diaphragm 32 of a vacuum servo motor 33. A spring 34 normally maintains these parts in the position shown.

A valve 35 controls the flow of fluid power from pipe 36 to pipe 37, the latter leading to the vacuum motor 33. Pipe 36 communicates with a valve 38, operable by the control button 25, when in the position shown, to establish communication with a pipe 39 leading from an intake manifold or other source of fluid power. The valve 35 is connected to the brake pedal 40 by a spring 41.

With the parts in the position shown and the vehicle being operable at speeds below 40 M. P. H., depressing the brake pedal 40 will cause valve 35 to establish communication between pipes 36 and 37 so that the diaphragm 32 will move to the left. This causes the sleeve 27 to move toward the right for moving the weighted pawls 24 in a position to engage grooves 23. Engagement is readily secured because it has been necessary to first release the accelerator pedal before depressing the foot pedal 40. This will allow sufficient time for the speeds of cage 22 and pawls 24 to equalize, as hereinbefore explained. With the cage 22 engaged by the pawls 24, the car is "in gear" during braking thereof and consequently less time and power will be required to bring the car to a stop. Even though this "in gear" ratio is "higher" than the normal direct drive, considerable braking effort of the engine will be realized.

When desiring to stop the car while operating at speeds in excess of 40 M. P. H., initial application of brakes will move the sleeve beneath the pawls 24 to prevent their disengaging the cage 22 so that the vehicle will be maintained in an "in gear" position during braking period. Release of the brake pedal 40 will result in the valve 35 being returned to its original position shown in Fig. 1 since the spring 41 will compress and act as a lever in forcing the valve 35 to the right.

It will be appreciated that this feature will be of advantage in that use of the "overdrive" and/or "freewheeling" devices may be safely extended for operation in traffic or in hilly and mountainous country.

I claim:

1. In an automotive device comprising a brake operating mechanism, a power input shaft, a power output shaft, a gear train between said shafts, means responsive to a coasting load on said output shaft for rendering said gear train operative whereby said input shaft operates said output shaft through said gear train, a source of fluid power, and means controlled by said brake operating mechanism for rendering said gear train operative by fluid power.

2. In an automotive device comprising a brake operating mechanism, a power input shaft, a power output shaft, a gear train between said shafts, and means responsive to a coasting load on said output shaft for rendering said gear train operative whereby said input shaft operates said output shaft through said gear train, the improvement which consists in providing separate means for rendering said gear train operative, said separate means including a source of fluid power, a fluid motor operatively connected to said last-named means, and means controlled by said brake operating mechanism for establishing communication between the source of fluid power and said fluid motor.

3. In an automotive device comprising a brake operating mechanism, a power input shaft, a power output shaft, a gear train between said shafts, means responsive to a coasting load on said output shaft and at a predetermined rate of speed thereof for rendering said gear train operative whereby said input shaft operates said output shaft through said gear train, and means controlled by said brake operating mechanism for maintaining said gear train in operative relation when the speed of said output shaft is below the predetermined rate.

4. In an automotive device comprising a brake operating mechanism, a power input shaft, a power output shaft, a gear train between said shafts, means responsive to a coasting load on said output shaft and at a predetermined rate of speed thereof for rendering said gear train operative whereby said input shaft operates said output shaft through said gear train, a source of fluid power, and means controlled by said brake operating mechanism for maintaining said gear train in operative relation by fluid power when the speed of said output shaft is below the predetermined rate.

5. In an automotive device comprising a brake operating mechanism, a power input shaft, a power output shaft, a gear train between said shafts, means responsive to a coasting load on said output shaft and at a predetermined rate of speed thereof for rendering said gear train operative whereby said input shaft operates said output shaft through said gear train, separate means for maintaining said gear train operative when the speed of said output shaft is below the predetermined rate, a source of fluid power, a fluid motor operatively connected to said last-named means, and means controlled by said brake operating mechanism for establishing communication between the source of fluid power and said fluid motor.

6. In an automotive device comprising a brake control pedal, a power input shaft, a power output shaft, planetary overdrive gearing between said shafts including a portion having radial slots therein, a radially movable pawl arranged to engage one of said radial slots whereby said planetary overdrive gearing is rendered operative for driving said output shaft at a speed greater than the speed of said input shaft, and a source of power, the improvement which consists in providing a servo-motor for controlling the radial movement of said pawl, and means operable by said brake control pedal for energizing said servo-motor by power from the source thereof and also for effecting de-energization thereof.

7. In an automotive device comprising a speed control pedal, a power input shaft, a power output shaft, planetary overdrive gearing between said shafts including a portion having radial slots therein, a radially movable pawl arranged to engage one of said radial slots, only upon establishment of a coasting load on said output shaft, whereby said planetary overdrive gearing is rendered operative for driving said output shaft at a speed greater than the speed of said input shaft, and a source of power, the improvement which consists in providing a servo-motor operatively associated with said pawl for effecting the radial movement, by power means, of said pawl into engagement with one of said radial slots, and means responsive to movement of said speed control pedal for energizing said servo-motor by power from the source thereof.

8. In an automotive device comprising a power input shaft, a power output shaft, planetary overdrive gearing between said shafts including a portion having radial slots therein, a radially movable pawl arranged to engage one of said radial slots, only upon establishment of a coasting load on said output shaft, whereby said planetary overdrive gearing is rendered operative for rotating said output shaft at a speed greater than the speed of said input shaft, and a source of power, the improvement which consists in providing a servo-motor operatively associated with said pawl for effecting the radial movement of said pawl, by power means, to engage one of said radial slots, and means for energizing said servo-motor by power from the source thereof.

CHARLES J. SURDY.